J. W. PERKINS AND D. W. ROBERTS.
CIRCLE CUTTER.
APPLICATION FILED APR. 15, 1919.
1,316,642.
Patented Sept. 23, 1919.
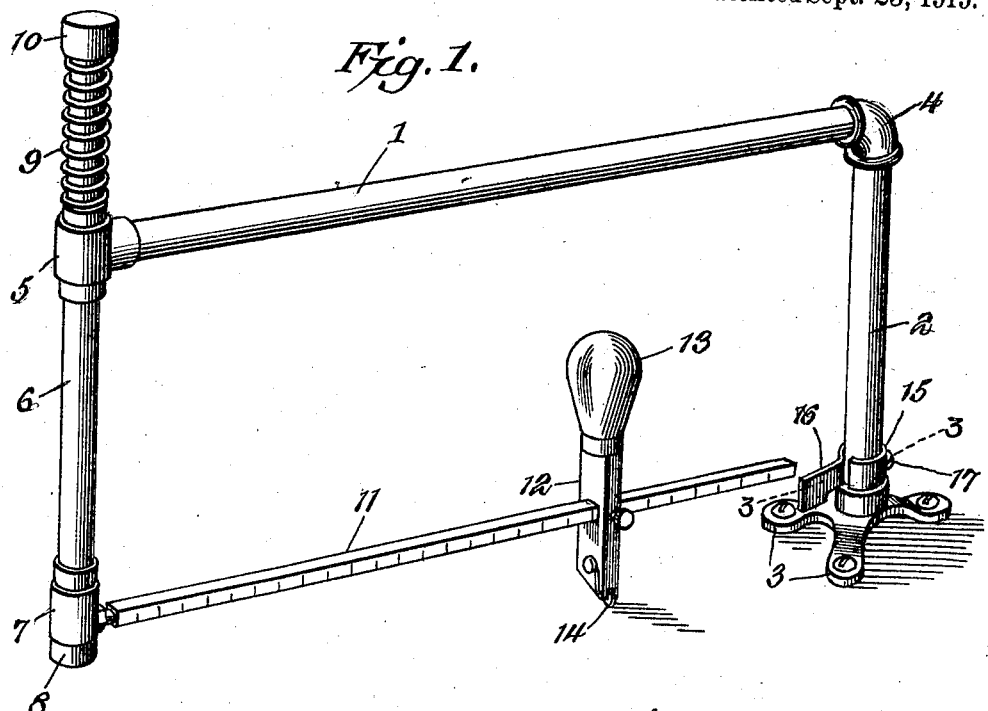
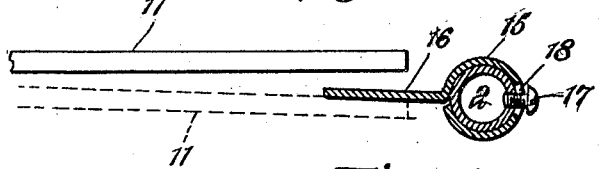
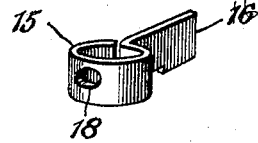
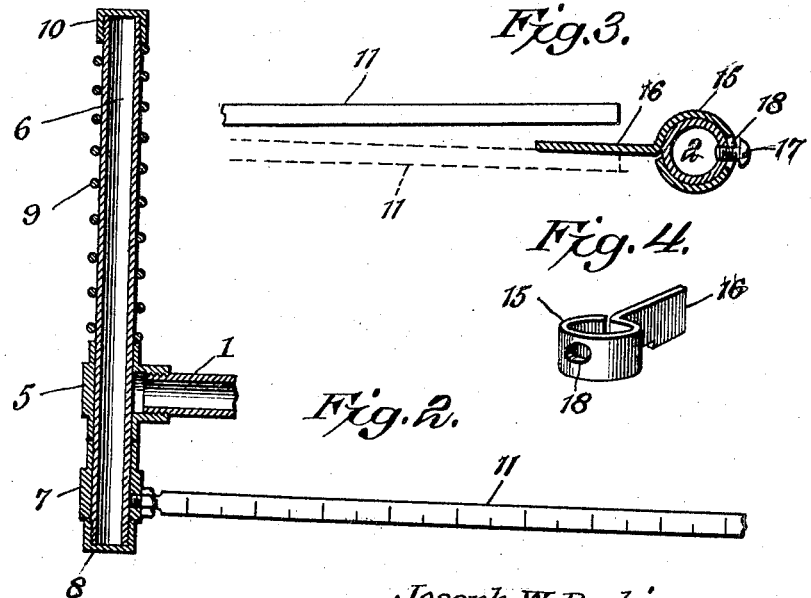
Joseph W. Perkins
and Daniel W. Roberts, INVENTORS.
BY W. C. Carman
ATTORNEY

UNITED STATES PATENT OFFICE.

JOSEPH W. PERKINS AND DANIEL W. ROBERTS, OF YOUNGSTOWN, OHIO.

CIRCLE-CUTTER.

1,316,642.   Specification of Letters Patent.   Patented Sept. 23, 1919.

Application filed April 15, 1919. Serial No. 290,148.

*To all whom it may concern:*

Be it known that we, JOSEPH W. PERKINS and DANIEL W. ROBERTS, citizens of the United States, residing at Youngstown, in the county of Mahoning and State of Ohio, have invented certain new and useful Improvements in Circle-Cutters, of which the following is a specification.

This invention relates, generally, to circle cutters, but is designed primarily as a glazier's tool for cutting glass.

Generally speaking, the device comprises a supporting bracket consisting of an upright standard and a horizontal arm, a perpendicular reciprocating spindle carried by said arm at its outer end, a knife-carrying bar rotatably mounted upon the spindle, and a cutting device adjustably mounted upon the bar.

Figure 1 of the drawing is a view in perspective of our device; Fig. 2 is a fragmentary view partially in section showing the method of assembling the operating parts of the device; Fig. 3 is a cross-section on line 3—3 Fig. 1, and also showing the knife-carrying bar with reference to its starting and finishing relation to the stop gage; and Fig. 4 is a perspective view of the stop gage and its securing collar.

The same reference characters designate corresponding parts of the device throughout the various figures of the drawings.

The arm 1, preferably of tubular formation, is carried by the standard 2, also preferably of tubular formation, and supported by the base or feet 3, the members 1 and 2 being joined, as shown in the drawing, by the curved union 4. This supporting bracket may, of course, be formed integrally by simply bending a rod or tube so that its opposite ends will stand at substantially right angles to each other.

Rigidly attached to the free or outer end of the arm 1 (shown in the drawing as a threaded engagement) is the vertical sleeve 5, within which is reciprocally mounted the stem or spindle 6.

Slidably and rotatably mounted upon the lower end of the spindle 6 is the sleeve 7 with its lower end resting upon the head 8.

Surrounding the upper end of the spindle 6 is the spiral spring 9, having for its opposing contact or engaging stops the upper spindle head 10 and the sleeve 5, respectively.

Rigidly secured to the sleeve 7 (shown in the drawing as a threaded engagement) is the graduated knife-carrying bar 11, upon which is adjustably mounted the knife-block 12, provided with the handle 13 and carrying the cutter 14.

It will be observed that the graduations on this bar are arranged in one-half inch units instead of one inch units, thus facilitating the operation of adjustment of the cutter,—one-half inch on the radius being equivalent to one inch on the diameter.

Yieldingly mounted upon the lower end of the standard 2 is the collar 15 with its extension wing 16, the purpose of which will be hereafter explained. This collar is secured to the standard by means of the screw 17 passing through the oblong hole 18, thus permitting the collar to slightly rotate upon the standard.

Obviously, the function of the spring 9 is to hold the knife-carrying bar 11 above and away from the table or base to which the device is fastened, that being its normal position when not in use.

The operation of the device is as follows: The plate or material to be operated upon is laid on the table to which the cutter is securely fastened. The spindle 6 is then pushed downwardly until its lower head 8 rests upon the material, where it is firmly held by pressure upon the head 10; then the knife-carrying bar 11 is brought to the starting point just in advance of the stop gage or wing 16 in its extreme retarded position, from which point the knife is started around the circle, which will be completed when the bar 11 engages the rear side of the stop wing 16 in its extreme advanced position.

We claim:

1. In a device of the character described, a supporting bracket consisting of an upright standard and an overhanging arm, a perpendicular spindle slidably mounted upon the outer end of the bracket arm and adapted to be forced downwardly so that its lower end will engage the material being operated upon, a knife-carrying bar rotatably mounted upon said spindle, and a cutter attached to said bar.

2. In a device of the character described, a supporting bracket consisting of an upright standard and an over-hanging arm, a perpendicular spindle slidably mounted upon the outer end of the bracket arm and adapted to be forced downwardly so that its lower end will engage the material being operated upon, a coil spring surrounding said spindle to hold it normally in its elevated position, a knife-carrying bar rotatably mounted upon said spindle, and a cutter attached to said bar.

3. In a device of the character described, a supporting bracket consisting of an upright standard and an over-hanging arm, a vertical sleeve carried by the outer end of the bracket arm, a spindle slidably mounted in said sleeve and adapted to be forced downwardly so that its lower end will engage the material being operated upon, a knife-carrying bar rotatably mounted upon said spindle and a cutter attached to said bar.

4. In a device of the character described, a supporting bracket consisting of an upright standard and an over-hanging arm, a perpendicular spindle slidably mounted upon the outer end of the bracket arm and adapted to be forced downwardly so that its lower end will engage the material being operated upon, a coil spring surrounding said spindle above the bracket arm, a collar slidably and rotatably mounted upon said spindle below the bracket arm, a knife-carrying bar rigidly secured to said collar, and a cutter attached to said bar.

5. In a device of the character described, a supporting bracket consisting of an upright standard and an over-hanging arm, a perpendicular spindle slidably mounted upon the outer end of the bracket arm and adapted to be forced downwardly so that its lower end will engage the material being operated upon, a knife-carrying bar rotatably mounted upon said spindle, a cutter attached to said bar, and a stop gage mounted upon said bracket standard.

6. In a device of the character described, a supporting bracket consisting of an upright standard and an over-hanging arm, a perpendicular spindle slidably mounted upon the outer end of the bracket arm and adapted to be forced downwrdly so that its lower end will engage the material being operated upon, a coil spring surrounding said spindle with its lower end in contact with the bracket arm and its upper end in contact with the spindle head, a knife-carrying bar rotatably mounted upon said spindle, a cutter attached to said bar, and a stop gage mounted upon said bracket standard.

7. In a device of the character described, a supporting bracket consisting of an upright standard and an over-hanging arm, a vertical sleeve carried by the outer end of the bracket arm, a spindle slidably mounted in said sleeve and adapted to be forced downwardly so that its lower end will engage the material being operated upon, a knife-carrying bar rotatably mounted upon said spindle, a cutter attached to said bar, and a stop gage mounted upon said bracket standard.

8. In a device of the character described, a supporting bracket consisting of an upright standard and an over-hanging arm, a perpendicular spindle slidably mounted upon the outer end of the bracket arm and adapted to be forced downwardly so that its lower end will engage the material being operated upon, a coil spring surrounding said spindle above the bracket arm, a collar slidably and rotatably mounted upon said spindle below the bracket arm, a knife-carrying bar rigidly secured to said collar, a cutter attached to said bar, and a stop gage mounted upon said bracket standard.

In testimony whereof we hereunto affix our signatures in the presence of two witnesses.

JOSEPH W. PERKINS.
DANIEL W. ROBERTS.

Witnesses:
RALPH R. MILLER,
B. W. BROCKWAY.

Copies of this patent may be obtained for five cents each, by addressing the "Commissioner of Patents, Washington, D. C."